United States Patent
Schindler

(10) Patent No.: US 12,332,629 B2
(45) Date of Patent: Jun. 17, 2025

(54) METHOD FOR THE ADDITIVE MANUFACTURING OF AT LEAST ONE COMPONENT OF DEFINED COMPONENT PROPERTIES

(71) Applicant: SCHUBERT ADDITIVE SOLUTIONS GMBH, Crailsheim (DE)

(72) Inventor: Marcus Schindler, Schwäbisch Hall (DE)

(73) Assignee: Schubert Additive Solutions GmbH, Crailsheim (DE)

( * ) Notice: Subject to any disclaimer, the term of this patent is extended or adjusted under 35 U.S.C. 154(b) by 620 days.

(21) Appl. No.: 17/602,108

(22) PCT Filed: Mar. 17, 2020

(86) PCT No.: PCT/EP2020/057226
§ 371 (c)(1),
(2) Date: Apr. 25, 2022

(87) PCT Pub. No.: WO2020/216533
PCT Pub. Date: Oct. 29, 2020

(65) Prior Publication Data
US 2022/0244703 A1    Aug. 4, 2022

(30) Foreign Application Priority Data
Apr. 11, 2019    (DE) .......................... 102019109655.3

(51) Int. Cl.
*G05B 19/4099*    (2006.01)
*B29C 64/386*    (2017.01)
(Continued)

(52) U.S. Cl.
CPC ........ *G05B 19/4099* (2013.01); *B29C 64/386* (2017.08); *B29C 64/40* (2017.08);
(Continued)

(58) Field of Classification Search
None
See application file for complete search history.

(56) References Cited

U.S. PATENT DOCUMENTS

| | | |
|---|---|---|
| 2008/0111816 A1 | 5/2008 | Abraham et al. |
| 2010/0031046 A1 | 2/2010 | Heinemann |

(Continued)

FOREIGN PATENT DOCUMENTS

| | | |
|---|---|---|
| CN | 105555509 | 5/2016 |
| CN | 108616501 | 10/2018 |

(Continued)

OTHER PUBLICATIONS

Jakk, "What File Formats Are Used in 3D Printing", https://additive-x.com/blog/file-formats-used-3d-printing, published Sep. 8, 2021, accessed Apr. 23, 2025.

*Primary Examiner* — David Earl Ogg
(74) *Attorney, Agent, or Firm* — Rimon PC

(57) ABSTRACT

A method for the additive manufacturing of at least one component having defined component properties, comprising the steps of:
  providing at least one certified data record which contains component-specific parameters and/or system-specific parameters and/or process-specific parameters certified by a provider for an additive manufacturing process of at least one specific component having defined component properties,
  implementing at least one additive manufacturing process for the additive manufacturing of at least one specific component having defined component properties on the basis of the at least one certified data record.

19 Claims, 3 Drawing Sheets

(51) Int. Cl.
  *B29C 64/40* (2017.01)
  *B33Y 40/20* (2020.01)
  *B33Y 50/00* (2015.01)
(52) U.S. Cl.
  CPC .............. *B33Y 40/20* (2020.01); *B33Y 50/00* (2014.12); *G05B 2219/2646* (2013.01)

(56) References Cited

U.S. PATENT DOCUMENTS

| | | | |
|---|---|---|---|
| 2017/0039363 A1 | 2/2017 | Chen et al. | |
| 2017/0253401 A1* | 9/2017 | Bouthillier | B65D 11/00 |
| 2017/0255171 A1 | 9/2017 | Avula et al. | |
| 2018/0012311 A1* | 1/2018 | Small | B22F 10/39 |
| 2018/0094953 A1 | 4/2018 | Colson et al. | |
| 2018/0136633 A1* | 5/2018 | Small | G06Q 30/018 |
| 2018/0214947 A1* | 8/2018 | Haro Gonzalez | B29C 64/153 |
| 2018/0264553 A1* | 9/2018 | Dave | B22F 10/31 |
| 2018/0311734 A1* | 11/2018 | Herzog | B22F 10/28 |
| 2019/0001655 A1* | 1/2019 | Blom | B33Y 50/02 |
| 2019/0022924 A1 | 1/2019 | Schumann et al. | |
| 2019/0022949 A1* | 1/2019 | Herzog | B33Y 50/02 |
| 2019/0072932 A1 | 3/2019 | Sitnikov et al. | |
| 2019/0389137 A1* | 12/2019 | Frohnmaier | B22F 10/38 |

FOREIGN PATENT DOCUMENTS

| | | |
|---|---|---|
| CN | 109202073 | 1/2019 |
| EP | 3432178 A1 | 1/2019 |
| JP | 2007102732 A * | 4/2007 |
| WO | 2015020939 A1 | 2/2015 |
| WO | 2017194137 A1 | 11/2017 |
| WO | 2018127827 A1 | 7/2018 |

* cited by examiner

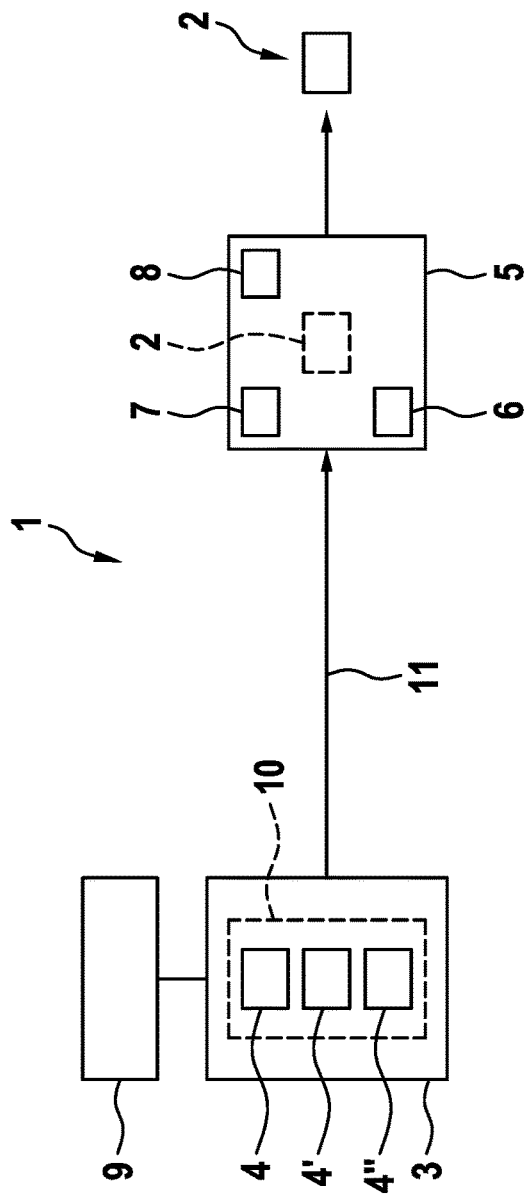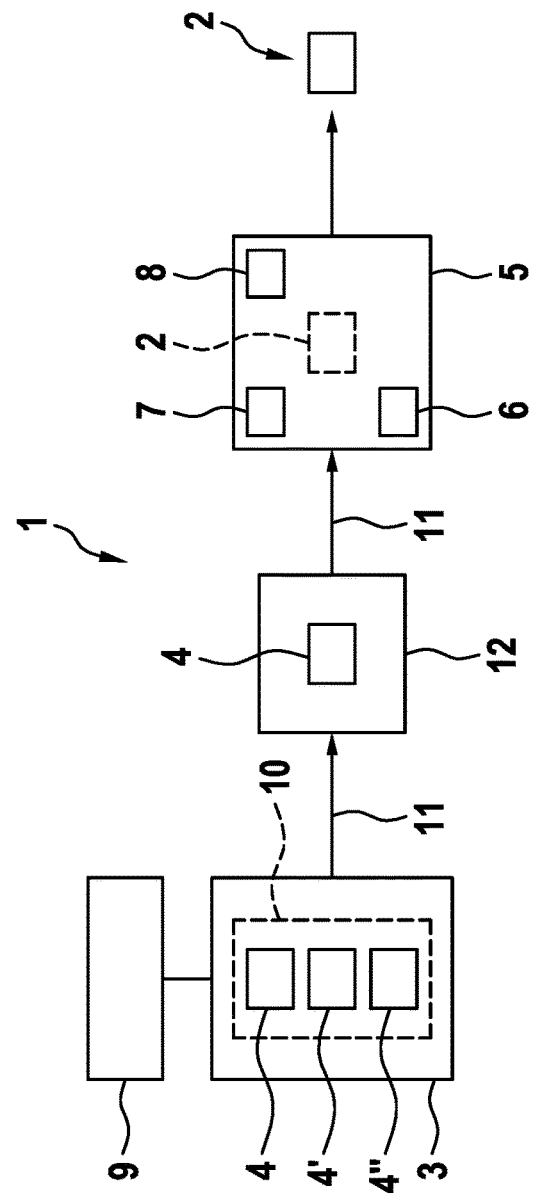

Fig. 4

| Part | Name | Model | Printer | Download |
|---|---|---|---|---|
| # 1 | Part 1 | △ | Printer 1 | 🛒 |
| # 2 | Part 2 | □ | Printer 2 | 🛒 |

Fig. 5

| Part | Name | Printer | Status | Duration |
|---|---|---|---|---|
| # 1 | Part 1 | Printer 1 | OK | 2h18min |

METHOD FOR THE ADDITIVE MANUFACTURING OF AT LEAST ONE COMPONENT OF DEFINED COMPONENT PROPERTIES

CROSS-REFERENCE TO RELATED APPLICATIONS

This application claims priority to Patent Cooperation Treaty application serial number PCT/EP2020/057226, filed Mar. 17, 2020, which claims priority to European patent application serial number 10 2019 109 655.3, filed Apr. 11, 2019, the contents of each of which are incorporated herein by reference in their entirety.

The invention relates to a method for the additive manufacturing of at least one component having defined component properties.

Corresponding methods for the additive manufacturing of a component having defined component properties are known from the prior art in a large number of different configurations.

Even though corresponding methods for producing components having a wide range of functional and structural configurations have become established in the meantime in principle, varied knowledge is required for the actual additive manufacturing of a component having defined component properties.

Corresponding knowledge includes, in particular, selecting suitable system-specific, component-specific and process-specific parameters which facilitate the additive manufacturing of a component having defined component properties, i.e. in particular a desired component quality. Corresponding parameters typically have to be compiled for each component to be additively manufactured in order for it to be possible to produce desired component properties, i.e. in particular a desired component quality, in a reliable and reproducible manner.

It follows that, specifically, the additive manufacturing of a component having defined component properties is typically associated with considerable complexity in order to obtain corresponding parameters by means of which reliable and reproducible additive manufacturing of a component having defined component properties is possible.

Proceeding therefrom, the object of the invention is to provide a method which allows a user to additively manufacture a component having defined component properties in a reliable and reproducible manner, in particular without separately compiling parameters required for the additive manufacturing of the relevant component having defined component properties.

The object is achieved by the subjects of the independent claims, i.e. in particular a method for the additive manufacturing of a component having defined component properties according to independent claim 1. The claims that are dependent thereon relate to possible embodiments of the subjects of the independent claims.

A first aspect of the invention described herein relates to a method for the additive manufacturing or production of at least one component having defined component properties. The method therefore includes methods and/or processes for the additive manufacturing or production of at least one component having defined component properties.

By means of the method, the various components or component groups can be additively manufactured in principle. In particular, technical components or component groups can be additively manufactured. In this context, both newly constructed technical components or component groups and replacement or retrofit components or replacement or retrofit component groups for a certain technical apparatus, such as a machine, are additively manufactured. Examples of technical fields in which components or component groups manufactured according to the method and thus also the method described herein can be used are the fields of automation, robotics, handling, packaging, etc. Therefore, according to the method, components or component groups for automation apparatuses, robotics apparatuses, handling apparatuses and packaging apparatuses can be additively manufactured, for example. Specifically, such components or component groups may e.g. be handling elements, such as gripping elements, suction elements, etc. Respective components or component groups can be manufactured to have at least one additional function, for example formed by internal structures, such as temperature-control duct structures, through which a temperature-control medium can flow, flow-duct structures, through which a flow medium can flow, etc.

The method comprises the following steps, which are described in greater detail in the following:

In a first step of the method, at least one certified data record is provided which contains system-specific parameters and/or component-specific parameters and/or process-specific parameters certified by a provider for an additive manufacturing process of at least one specific component having defined component properties. In the first step of the method, at least one certified data record is therefore provided by a provider, which record contains certified system-specific parameters and/or component-specific parameters and/or process-specific parameters for an additive manufacturing process of at least one component having defined component properties. The first step is typically carried out by a provider.

The at least one certified data record typically contains all the required system-specific parameters and/or component-specific parameters and/or process-specific parameters that are required for the additive manufacturing of a specific component having defined component properties. In other words, all the system-specific information and/or component-specific information and/or process-specific information for the additive manufacturing of a relevant specific component having defined component properties, i.e. in particular also machine-readable control information for controlling and/or regulating the operation of an additive manufacturing apparatus used for carrying out an additive manufacturing process for the additive manufacturing of a relevant component having defined component properties, is provided in the at least one certified data record.

Therefore, a separate certified data record can be provided for any component that is manufactured or is to be manufactured according to the method. This is therefore in particular the case when certain system-specific parameters and/or component-specific parameters and/or process-specific parameters are required for producing specific component properties, therefore specific component properties can be correlated with certain system-specific parameters and/or component-specific parameters and/or process-specific parameters, such that only a certain combination of system-specific parameters and/or component-specific parameters and/or process-specific parameters allows for reliable and reproducible additive manufacturing of a component having defined component properties. It follows that the at least one certified data record typically contains a certain combination of system-specific parameters and/or component-specific parameters and/or process-specific parameters for the production of a specific component having defined component properties.

In this case, a certain combination of corresponding parameters contained in the at least one certified data record typically relates to a certain additive manufacturing process for a specific component having defined component properties, which process can be carried out using a certain additive manufacturing apparatus. The at least one certified data record therefore typically contains a customised combination of system-specific parameters and/or component-specific parameters and/or process-specific parameters for a certain additive manufacturing process that can be carried out using a certain additive manufacturing apparatus, which combination allows for reliable and reproducible additive manufacturing of a component having defined component properties. Therefore, certified data records for manufacturing components having the same defined component properties can nevertheless differ in at least one system-specific parameter and/or component-specific parameter and/or process-specific parameter if these parameters are taken as basis for different additive manufacturing processes and/or the operation of different additive manufacturing apparatuses.

As part of carrying out the method, a user of the method who wants to perform additive manufacturing of a component having defined component properties provides the at least one certified data record provided to them by a provider to an additive manufacturing apparatus used for carrying out an additive manufacturing process for the additive manufacturing of the relevant component having defined component properties, whereupon the additive manufacturing process for manufacturing the relevant component having defined component properties can be carried out without user-side intervention, in particular fully automatically, solely on the basis of the at least one certified data record. At least one additive manufacturing process for the additive manufacturing of at least one specific component having defined component properties can therefore be implemented on the basis of the at least one certified data record by means of a user-side additive manufacturing apparatus in a fully automated manner, in particular without any user-side intervention.

As already indicated, the at least one certified data record may also contain machine-readable control information for the in particular fully automatic control and/or regulation of the operation of at least one additive manufacturing apparatus for the additive manufacturing of the at least one component to be additively manufactured on the basis of the at least one certified data record. The corresponding control information may e.g. be a relevant machine code (G-code) of a relevant additive manufacturing apparatus. Corresponding control information may be described directly or indirectly by corresponding system-specific parameters and/or component-specific parameters and/or process-specific parameters contained in the at least one certified data record.

For the additive manufacturing of a component having defined component properties, a user therefore only requires an additive manufacturing apparatus, often also called a 3D printer, and a corresponding certified data record, which is provided in the form of data to the additive manufacturing apparatus, i.e. typically to a controller that is implemented with hardware and/or software and controls or regulates the operation of the additive manufacturing apparatus.

As is also clear from the following, a user of the method therefore in particular does not have to compile corresponding parameters which allow them to carry out reliable and reproducible additive manufacturing of a relevant component having defined component properties, since all the parameters are already contained in the at least one certified data record taken as a basis for the additive manufacturing process. A user of the method also does not need their own experience or knowledge in the field of additive manufacturing, since all the "knowledge" regarding the additive manufacturing of a relevant component having defined component properties sought by the user is contained in the at least one certified data record.

Typically, before the first step, a provider defines corresponding certified system-specific parameters and/or component-specific parameters and/or process-specific parameters for an additive manufacturing process and combines or has combined said parameters in a corresponding certified data record in the form of data. Therefore, defining corresponding system-specific parameters and/or component-specific parameters and/or process-specific parameters and combining said parameters in a corresponding certified data record can also constitute a step of the method.

In a second step of the method, at least one additive manufacturing process for the additive manufacturing of at least one specific component having defined component properties is implemented on the basis of the at least one certified data record provided in the first step. The second step is typically carried out by a user of the method.

In the second step, all the additive manufacturing processes, i.e. in particular all the additive manufacturing processes based on a powder (bed) and all the additive manufacturing processes not based on a powder (bed), can be implemented in principle. An additive manufacturing process that is specifically implemented in the second step is in particular defined by the system-specific parameters and/or process-specific parameters contained in the respectively used certified data record.

In the second step, depending on the additive manufacturing process that is specifically implemented, different construction materials, i.e. metals, plastics materials, etc., for example, can be processed in principle. Accordingly, in the second step, an additive manufacturing process can e.g. be implemented in which a metal-based or plastics-based construction material is processed or used for the additive manufacturing of the at least one component. In particular, in the second step, a fused deposition modelling (FDM) process can be implemented, in which a plastics-based construction material is used for the additive manufacturing of the at least one component. FDM processes are characterised by a comparatively high construction rate together with very good component properties. The method can, however, also be implemented using other additive manufacturing processes, such as binder jetting processes, digital light synthesis processes, CLIP processes, SLM processes, SLS processes, SEBM processes, stereolithography processes, etc.

In summary, a method is provided which allows a user to additively manufacture a component having defined component properties in a reliable and reproducible manner, in particular without separately compiling parameters required for the additive manufacturing of the relevant component having defined component properties. The method therefore lays the foundation for a new type of additive manufacturing on demand at the same time.

The method may also include providing a certified data record which contains system-specific parameters and/or component-specific parameters and/or process-specific parameters certified by a provider for preparing an additive manufacturing process of the or at least one specific component having defined component properties, and implementing at least one measure for preparing the or at least one additive manufacturing process for the additive manufacturing of at least one specific component having defined component properties on the basis of the at least one certified data record. A user therefore (also) does not need their own experience or knowledge of a corresponding preparatory measure, since all the "knowledge" required for this purpose can be contained in the at least one certified data record. This can be considered to be a separate aspect of the invention.

The at least one measure for preparing the additive manufacturing process implemented on the basis of the at least one certified data record may e.g. include a measure for preparing a construction material to be used as part of the additive manufacturing process carried out for the additive manufacturing of a component having specific component properties, in particular temperature control, drying, inerting, etc., of the construction material. The measure is typically selected with regard to an additive manufacturing process to be specifically implemented or a construction material that is specifically used as part of carrying out an additive manufacturing process to be specifically implemented. For example, additive manufacturing processes based on a powder (bed) may require different preparatory measures from additive manufacturing processes not based on a powder (bed).

The method may also include providing a certified data record which contains system-specific parameters and/or component-specific parameters and/or process-specific parameters certified by a provider for the post-processing of the or at least one additive manufacturing process of at least one specific component having defined component properties, and implementing at least one measure for the post-processing of the or at least one additive manufacturing process for the additive manufacturing of at least one specific component having defined component properties on the basis of the certified data record. A user therefore (also) does not need their own experience or knowledge of a corresponding post-processing measure, since all the "knowledge" required for this purpose can be contained in the at least one certified data record. This can likewise be considered to be a separate aspect of the invention.

The at least one measure for the post-processing of the additive manufacturing process may include a measure for the post-processing of the component additively manufactured as part of the additive manufacturing process implemented on the basis of the at least one certified data record, in particular mechanical and/or thermal post-treatment of the additively manufactured component, such as mechanical surface processing at least in portions for producing certain surface properties, thermal treatment at least in portions for producing certain structural properties, etc. The measure is typically selected with regard to a specifically implemented additive manufacturing process or a construction material that is specifically used as part of carrying out a specifically implemented additive manufacturing process. For example, components manufactured by means of additive manufacturing processes based on a powder (bed) may require different post-processing measures from components manufactured by means of additive manufacturing processes not based on a powder (bed). In the same way, components manufactured from metal may require different post-processing measures from components manufactured from plastics material.

It is likewise conceivable for a certified data record 4, 4', 4" to contain both system-specific parameters and/or component-specific parameters and/or process-specific parameters certified by a provider for an additive manufacturing process of at least one specific component having defined component properties and system-specific parameters and/or component-specific parameters and/or process-specific parameters certified by a provider for the preparation and/or post-processing of an additive manufacturing process of the or at least one specific component having defined component properties.

In the following, examples of component-specific parameters that are or can be certified, in particular by a provider, and can be contained in the at least one certified data record are provided in a non-exhaustive list.

The at least one certified data record may e.g. contain at least one geometric-structural parameter of the at least one component to be additively manufactured, in particular all the geometric-structural parameters of the at least one component to be additively manufactured, as component-specific parameters. The at least one certified data record may therefore contain one or more, in particular all the, geometric-structural parameters, i.e. dimensions, shape, volume, etc., for example, of the at least one component to be additively manufactured. The geometric-structural properties of the at least one component to be additively manufactured and the resulting structural and functional configuration of the at least one component to be additively manufactured can therefore be defined by the at least one certified data record, in particular completely.

Alternatively or additionally, the at least one certified data record may contain at least one chemical parameter of the at least one component to be additively manufactured, in particular all the chemical parameters of the at least one component to be additively manufactured, as component-specific parameters. The at least one certified data record may therefore contain one or more, in particular all the, chemical parameters, i.e., for example, chemical ageing, in particular in certain chemical environments, chemical reactivity, in particular in certain chemical environments, chemical compatibility with certain media, chemical composition, etc., of the at least one component to be additively manufactured. The chemical properties of the at least one component to be additively manufactured can therefore be defined by the at least one certified data record, in particular completely.

Alternatively or additionally, the at least one certified data record may contain at least one physical parameter of the at least one component to be additively manufactured, in particular all the physical parameters of the at least one component to be additively manufactured, as component-specific parameters. The at least one certified data record may therefore contain one or more, in particular all the, geometric-structural parameters, i.e., for example, electrical parameters, such as electrical conductivity, mechanical parameters, such as strength, hardness, ductility, etc., thermal parameters, such as thermal conductivity, thermal capacity, etc., tribological parameters, such as roughness, and other physical parameters, such as density, mass, etc., of the at least one component to be additively manufactured. The physical properties of the at least one component to be additively manufactured can therefore be defined by the at least one certified data record, in particular completely.

In the following, examples of system-specific parameters that are or can be certified, in particular by a provider, and can be contained in the at least one certified data record are provided in a non-exhaustive list.

The at least one certified data record may e.g. contain at least one dimensional parameter, such as length, width, shape, etc., of at least one construction field or construction plane of at least one additive manufacturing apparatus that is used or is to be used for the additive manufacturing of the at least one component to be additively manufactured, in particular all the dimensional parameters of at least one construction field of at least one additive manufacturing apparatus that is used or is to be used for the additive manufacturing of the at least one component to be additively manufactured, as system-specific parameters. The dimensions of at least one construction field or construction plane of at least one additive manufacturing apparatus that is used or is to be used for the additive manufacturing of the at least one component to be additively manufactured can therefore be defined by the at least one certified data record, in particular completely.

Alternatively or additionally, the at least one certified data record may contain at least one dimensional parameter, such as length, width, height or depth, or spatial form, of at least one construction volume of at least one additive manufacturing apparatus that is used or is to be used for the additive manufacturing of the at least one component to be additively manufactured, in particular all the dimensional parameters of at least one construction volume of at least one additive manufacturing apparatus that is used or is to be used for the additive manufacturing of the at least one component to be additively manufactured, as system-specific parameters. The dimensions of at least one construction volume of at least one additive manufacturing apparatus that is used or is to be used for the additive manufacturing of the at least one component to be additively manufactured can therefore be defined by the at least one certified data record, in particular completely.

Alternatively or additionally, the at least one certified data record may contain at least one manufacturing parameter, such as a construction-rate parameter influencing the construction rate, a feed parameter influencing a material feed process of an in particular strand-like or strand-shaped construction material to be selectively arranged in a construction field or construction plane, an application or coating parameter influencing an application or coating process of an in particular powder-like or powder-shaped construction material to be applied in a construction field, an exposure or irradiation parameter influencing an exposure or irradiation process of a construction material that is to be exposed or irradiated and is applied in a construction field by means of at least one energy beam, such as an electron beam or laser beam, in particular for the purpose of selective hardening and/or for the purpose of the selective temperature control of the construction material, i.e., for example, energy-beam number, energy-beam intensity or power, energy-beam focal length, energy-beam focal position, etc., of at least one additive manufacturing apparatus that is used or is to be used for the additive manufacturing of the at least one component to be additively manufactured, in particular all the manufacturing parameters of at least one additive manufacturing apparatus that is used or is to be used for the additive manufacturing of the at least one component to be additively manufactured, as system-specific parameters. The manufacturing parameters of at least one additive manufacturing apparatus that is used or is to be used for the additive manufacturing of the at least one component to be additively manufactured can therefore be defined by the at least one certified data record, in particular completely.

Alternatively or additionally, the at least one certified data record may contain at least one system-type parameter, in particular a series parameter, model parameter, type parameter and/or manufacturer parameter, of at least one additive manufacturing apparatus that is used or is to be used for the additive manufacturing of the at least one component to be additively manufactured, in particular all the system-type parameters of at least one additive manufacturing apparatus that is used or is to be used for the additive manufacturing of the at least one component to be additively manufactured, as system-specific parameters. The system-type parameters of at least one additive manufacturing apparatus that is used or is to be used for the additive manufacturing of the at least one component to be additively manufactured can therefore be defined by the at least one certified data record, in particular completely.

In the following, examples of process-specific parameters that are or can be certified, in particular by a provider, and can be contained in the at least one certified data record are provided in a non-exhaustive list.

The at least one certified data record may contain at least one construction-material parameter, in particular the chemical and/or physical composition of a construction material, the powder-size distribution and/or powder morphology of a construction-material powder, if a powder-like or powder-shaped construction material is used, dimensions or cross-sectional geometry of a construction-material strand, if a strand-like or strand-shaped construction material is used, the viscosity of a liquid construction material, if a liquid construction material is used, the degree of purity or the recycled proportion of a construction material, the mixing ratio of a construction material, if a construction material comprising a plurality of different construction-material components is used, etc., of at least one construction material which is or can be used for the additive manufacturing by at least one additive manufacturing apparatus that is used or is to be used for the additive manufacturing of the at least one component to be additively manufactured, in particular all the construction-material parameters of at least one construction material which can be used for the additive manufacturing by at least one additive manufacturing apparatus that is used or is to be used for the additive manufacturing of the at least one component to be additively manufactured, as process-specific parameters. The construction-material parameters of at least one construction material that is used or is to be used for the additive manufacturing of the at least one component to be additively manufactured can therefore be defined by the at least one certified data record, in particular completely.

Alternatively or additionally, the at least one certified data record may contain at least one chemical process parameter, in particular a chemical atmosphere, such as an inert atmosphere, inside at least one construction and/or process area or volume of at least one additive manufacturing apparatus that is used or is to be used for the additive manufacturing of the at least one component to be additively manufactured, in particular all the chemical process parameters of at least one construction and/or process area or volume of at least one additive manufacturing apparatus that is used or is to be used for the additive manufacturing of the at least one component to be additively manufactured, as process-specific parameters. The chemical process parameters inside at least one construction and/or process area or volume of at least one additive manufacturing apparatus that is used or is to be used for the additive manufacturing of the at least one component to be additively manufactured can therefore be defined by the at least one certified data record, in particular completely.

Alternatively or additionally, the at least one certified data record may contain at least one physical process parameter, in particular moisture, pressure, temperature, etc., outside and/or inside at least one construction and/or process area or volume of at least one additive manufacturing apparatus that is used or is to be used for the additive manufacturing of the at least one component to be additively manufactured, in particular all the physical process parameters of at least one construction and/or process area of at least one additive manufacturing apparatus that is used or is to be used for the additive manufacturing of the at least one component to be additively manufactured, as process-specific parameters. The physical process parameters outside and/or inside at least one construction and/or process area or volume of at least one additive manufacturing apparatus that is used or is to be used for the additive manufacturing of the at least one component to be additively manufactured can therefore be defined by the at least one certified data record, in particular completely.

Alternatively or additionally, the at least one certified data record may contain at least one climatic process parameter, in particular moisture, pressure, temperature, outside and/or inside at least one environment of at least one additive manufacturing apparatus that is used or is to be used for the additive manufacturing of the at least one component to be additively manufactured, in particular all the climatic process parameters of at least one additive manufacturing apparatus that is used or is to be used for the additive manufacturing of the at least one component to be additively manufactured, as process-specific parameters. The climatic parameters inside at least one environment of at least one additive manufacturing apparatus that is used or is to be used for the additive manufacturing of the at least one component to be additively manufactured can therefore be defined by the at least one certified data record, in particular completely.

Alternatively or additionally, the at least one certified data record may contain at least one layer parameter (slice parameter), such as layer number, layer thickness, layer surface, etc., describing a division of the at least one component to be additively manufactured into individual layers each containing a cross section of the at least one component to be additively manufactured, in particular all the layer parameters describing a division of the at least one component to be additively manufactured into individual layers each containing a cross section of the at least one component to be additively manufactured, as process-specific parameters. The layer parameters (slice parameters) can therefore be defined by the at least one certified data record, in particular completely.

Alternatively or additionally, the at least one certified data record may contain at least one parameter, in particular a geometric-structural parameter and/or an arrangement parameter and/or orientation parameter relative to a component to be supported that is to be additively manufactured or has been additively manufactured, of at least one support element serving to support the at least one component that is to be additively manufactured or has been additively manufactured, in particular all the parameters of at least one support element serving to support the at least one component that is to be additively manufactured or has been additively manufactured, as process-specific parameters. The parameters of at least one support element serving to support the at least one component that is to be additively manufactured or has been additively manufactured can therefore be defined by the at least one certified data record, in particular completely.

Alternatively or additionally, the at least one certified data record may contain at least one construction-strategy parameter describing a construction strategy, i.e. in particular a construction-material application strategy, an exposure or irradiation strategy, etc., for the at least one component to be additively manufactured, in particular all the construction-strategy parameters describing a construction strategy for the at least one component to be additively manufactured, as process-specific parameters. The construction-strategy parameters describing a construction-strategy parameter for the at least one component to be additively manufactured can therefore be defined by the at least one certified data record, in particular completely.

As mentioned above, the at least one certified data record may contain at least one geometric-structural parameter, in particular all the geometric-structural parameters, of at least one support element serving to support the at least one component that is to be additively manufactured or has been additively manufactured as process-specific parameters. In this case, the at least one support element may be provided with at least one structural element that facilitates removal of the at least one support element from the additively manufactured component, in particular a weakening of the at least one support element, e.g. produced by a predetermined breaking point, and/or may be provided with a marker that visually highlights the support element to be removed, e.g. in colour, contrasting with the additively manufactured component. In connection with corresponding structural elements to be formed, information can also be contained in the at least one certified data record which relates to the subsequent handling, i.e. in particular the removal of support elements, of a component additively manufactured on the basis of the at least one certified data record when this information contains the in particular additive formation of corresponding structural elements.

In an embodiment, at least one parameter that is detected by means of an e.g. optical detection apparatus as part of the additive manufacturing of the at least one component to be additively manufactured and having defined component properties and relates to the additive manufacturing of the at least one component to be additively manufactured can be compared with at least one, in particular corresponding, reference parameter, which is in particular a system-specific parameter and/or a component-specific parameter and/or a process-specific parameter described by the at least one certified data record. Therefore, an additive manufacturing process that is currently being carried out can be checked against an additive manufacturing process described by the at least one certified data record, in particular in real time. In this way, an additive manufacturing process taking place on the basis of the at least one certified data record can be monitored.

In this embodiment, the comparison information can also be evaluated with regard to at least one evaluation criterion, in particular whether said criterion demonstrates that the parameter has exceeded or fallen below at least one parameter-specific limit value or limit-value range, and evaluation information describing the relevant evaluation result can be generated. The evaluation information may in particular indicate whether or to what extent the additively manufactured component satisfies or does not satisfy at least one evaluation criterion, in particular defined by the at least one limit value or limit-value range. The output can be carried out by outputting corresponding evaluation information to an in particular acoustic and/or optical and/or haptic output apparatus, i.e. a display, for example, and/or by transmitting corresponding evaluation information in the form of data to at least one communication partner.

In an embodiment, the at least one certified data record can be or can have been generated by the provider. In this case, the at least one certified data record can be or can have been generated by the provider e.g. on the basis of information from the provider, in particular on the basis of manufacturing results for a reference component corresponding to the component to be additively manufactured, which results are optionally empirically or iteratively obtained by the provider, preferably under defined manufacturing conditions. The at least one certified data record can therefore be based on the additive manufacturing of a reference component having defined component properties which (exactly) correspond to the component properties of a component to be manufactured according to the method. Therefore, the system-specific parameters and/or component-specific parameters and/or process-specific parameters on the basis of which a specific reference component having defined component properties has been manufactured in a reliable and reproducible manner, i.e. in particular all the system-specific parameters and/or component-specific parameters and/or process-specific parameters on the basis of which a specific reference component having defined component properties has been manufactured in a reliable and reproducible manner, can be used as a certified data record for the additive manufacturing of a component to be additively manufactured that (exactly) corresponds to the reference component or can be contained in the at least one certified data record. In other words, the system-specific parameters and/or component-specific parameters and/or process-specific parameters contained in the at least one certified data record can be considered to be parameters that have been tested out under certain system-specific and/or component-specific and/or process-specific circumstances, typically likewise represented by the certified data record, as part of the additive manufacturing of a specific reference component having defined component properties. The aspect already mentioned above that a user of the method does not have to compile corresponding parameters themselves which allow them to carry out reliable and reproducible additive manufacturing of a relevant component having defined component properties, since all the parameters are already contained in the at least one certified data record taken as a basis for the additive manufacturing process, follows from the above.

In another embodiment, however, the at least one certified data record also can be or can have been originally generated by a user or a third party, this being a natural person or legal entity that provides corresponding data records as an external service provider without wanting to manufacture additive components themselves. It is therefore conceivable for the at least one certified data record to be or to have been generated by the user or the third party on the basis of information from the user or the third party, in particular on the basis of manufacturing results for a reference component (exactly) corresponding to the component to be additively manufactured, which results are optionally empirically or iteratively obtained by the user or the third party, preferably under defined manufacturing conditions.

In this embodiment, the information provided by the user or the third party as a (potential) certified data record is, however, checked by the provider with regard to at least one authorisation criterion that is predetermined or can be predetermined by the provider, i.e. a safety criterion, quality criterion, etc., and is only authorised as a certified data record when positively authorised by the provider.

In an embodiment, the check may include comparing at least one system-specific parameter and/or component-specific parameter and/or process-specific parameter contained in the data record to be authorised with at least one system-specific reference parameter and/or component-specific reference parameter and/or process-specific reference parameter in particular corresponding to the above and generating comparison information describing the relevant comparison result.

In an embodiment, the authorisation may also include evaluating the comparison information with regard to at least one evaluation criterion, in particular whether said criterion demonstrates that the parameter has exceeded or fallen below at least one parameter-specific limit value or limit-value range. For example, a component-specific limit value or limit-value range may relate to certain geometric-structural, chemical and/or physical properties, with authorisation only being provided if these are observed. A safety criterion or quality criterion can be defined by a corresponding limit value or limit-value range.

In an embodiment, the authorisation may also include outputting at least one piece of evaluation or authorisation information describing the evaluation or authorisation result. The output of corresponding evaluation or authorisation information can be carried out by outputting corresponding evaluation or authorisation information via an in particular acoustic and/or optical and/or haptic output apparatus, i.e. a display, for example, and/or by transmitting corresponding evaluation information in the form of data to at least one communication partner.

In another embodiment, the at least one certified data record may contain a certain number, in particular a maximum number, of additive manufacturing processes that are possible on the basis of the at least one certified data record by means of a certain additive manufacturing device. In the at least one certified data record, it can therefore be determined how many components to be additively manufactured can be additively manufactured on the basis of the at least one certified data record as a maximum. The at least one certified data record may accordingly be configured in terms of hardware and/or software such that only a certain number of components having defined component properties can be manufactured thereby. In this way, the provider has the option of controlling the use of the at least one certified data record, which can also be an effective measure against unauthorised use of the at least one certified data record.

In another embodiment, the at least one certified data record, in particular the system-specific parameters and/or component-specific parameters and/or process-specific parameters contained therein, cannot be modified by a user. The at least one certified data record may accordingly be configured in terms of hardware and/or software, i.e. in particular protected against modifications by the user, such that a user cannot make any modifications to the at least one certified data record. This can be implemented e.g. by write protection of the parameters contained in the at least one certified data record. The at least one certified data record can be protected against undesired manipulation in this way.

In another embodiment, the at least one certified data record may be encrypted. The at least one certified data record may accordingly be configured in terms of hardware and/or software such that a key is required for it to be used. A user can therefore only use the at least one certified data record if they have a corresponding key for decryption. A corresponding key can be provided to a user by the provider. The provision of a corresponding key may be linked to payment information describing a successful payment process by the user being available.

In another embodiment, the at least one certified data record may be provided by the provider on a data memory, in particular a server, optionally a cloud server, that is or can be connected to at least one communication network, from which memory or server said data record is or can be retrieved by a user. A corresponding data memory can be assigned to the provider; a corresponding data memory can therefore be provided in the region of a data or communication infrastructure managed by the provider. The communication network may be a global or local communication network, therefore the internet or an intranet, for example. By providing the at least one certified data record on a corresponding data memory, in principle this can allow a user to retrieve said data record from any location and at any time. Any communication connection established between the data memory and the user can be encrypted.

In an embodiment, the at least one certified data record can be retrieved from the at least one data memory via a data-memory-side user interface that optionally is or can be configured in a user-customised manner. A corresponding user interface can be accessed by a user login procedure. All the user-side interactions with the at least one data memory can take place e.g. via web-based applications, such as particular software (apps), browsers, etc., implemented in user-side (portable) devices, such as computers, laptops, smartphones, tablets, smartwatches, smart glasses, etc.

In another embodiment, the at least one certified data record may (only) be retrieved by a user if payment information describing a (successful) payment process by the user is available, in particular on the data-memory side. A payment process may be a payment process for one-time access to the data memory for retrieving at least one specific certified data record. A payment process may, however, in the sense of a subscription, also be a payment process for repeated access to the data memory for retrieving at least one specific certified data record within a certain time period, i.e., for example, at least an hour, at least a day, at least a month, at least a year, etc.

In principle, a payment process can be performed in any manner. The user can e.g. conventionally perform payment processes by transferring a certain amount of money to the provider's bank account or, using suitable payment services, to a virtual payment receiver, i.e. via an internet-based payment portal, for example. It is also conceivable for a corresponding payment service to be integrated in a data-memory-side user interface, e.g. optionally as a separate user sub-menu. Alternatively or additionally, a corresponding payment service may e.g. also be implemented as software (an app) for a user-side (portable) device, e.g. a computer, laptop, smartphone, tablet, smartwatch, smart glasses, etc.

In another embodiment, the at least one certified data record can be retrieved or stored on a user-side access portal, from which it can then be retrieved on at least one user-side additive manufacturing apparatus. Therefore, a user (independently of the provider in this respect) can set up an access portal in its own data or communication infrastructure managed on the user side, from which portal certified data records can be retrieved on at least one user-side additive manufacturing apparatus. By means of the user-side access portal, (only) those certified data records can therefore be provided and retrieved which are relevant for the user in question, e.g. on the basis of a specific component program in the user's technical equipment. For example, by means of an access portal of a user from the field of packaging technology, only those certified data records can be provided and retrieved which relate to components that are actually constructed in the user's packaging machines. A corresponding access portal can be provided as a plug-in solution, which is optionally web-based, for a data or communication infrastructure managed on the user side, such that a data or communication infrastructure managed on the user side can be upgraded with a corresponding access portal in a simple manner.

In another embodiment, the at least one certified data record stored on a user-side access portal can be retrieved on at least one additive manufacturing apparatus of a customer of the user. This may in turn be linked to payment information describing a payment process by a customer of the user to the user and/or provider being available.

In another embodiment, the at least one certified data record and/or a user-side access portal can be provided on a portable data carrier that is or can be delivered to a user and is in particular capable of communicating or being networked, such as a USB stick, CD ROM, memory card, etc., in particular as a plug-in solution, which is optionally web-based, from which data carrier said data record is or can be retrieved by a user.

A corresponding data carrier that is capable of communicating or being networked can be configured to transmit data relating to the additive manufacturing process, i.e. status data, error data, etc., for example, to a communication partner, i.e. the provider, for example. This data can again be transmitted in an encrypted manner.

A corresponding data carrier can be delivered to a user if payment information describing a payment process by the user is available. The above comments in connection with corresponding payment information and payment processes apply by analogy.

In another embodiment, as part of implementing the at least one additive manufacturing process for the additive manufacturing of the or at least one specific component having defined component properties on the basis of the at least one certified data record on an in particular provider-side and/or user-side output apparatus, such as a display, at least one status display relating to the status of the relevant additive manufacturing process is generated and output. By means of a corresponding status display, an additive manufacturing process carried out on the basis of the at least one certified data record can be monitored, optionally in real time.

Another, optionally separate aspect of the invention described herein relates to a method for generating or producing at least one certified data record which contains system-specific parameters and/or component-specific parameters and/or process-specific parameters certified, in particular by a provider, for the additive manufacturing of at least one specific component having defined component properties. This method is characterised in that the at least one certified data record is or has been generated or produced, in particular by the provider, on the basis of information from the provider, in particular on the basis of manufacturing results for a reference component corresponding to the component to be additively manufactured, which results are empirically or iteratively obtained by the provider, preferably under defined manufacturing conditions. Alternatively, the at least one certified data record can be or can have been generated by the user or a third party on the basis of information from the user or the third party, in particular on the basis of manufacturing results for a reference component corresponding to the component to be additively manufactured, which results are empirically or iteratively obtained by the user or the third party, preferably under defined manufacturing conditions. In this case, the information from the user or the third party is typically checked by the provider with regard to at least one authorisation criterion that is predetermined or can be predetermined by the provider and said information is used as a certified data record (only) when authorised by the provider. All the configurations relating to the method for the additive manufacturing of a component having defined component properties apply by analogy to this method and vice versa.

Another, optionally separate aspect of the invention described herein relates to a system for the additive manufacturing of at least one specific component having defined component properties. The system is in particular configured to carry out the method described herein for the additive manufacturing of a component having defined component properties. The system comprises at least one provision apparatus that is or can be assigned to a provider and is implemented with hardware and/or software, which is configured to provide at least one certified data record, which contains system-specific parameters and/or component-specific parameters and/or process-specific parameters certified by the provider for the additive manufacturing of at least one specific component having defined component properties, and at least one additive manufacturing apparatus that is or can be assigned to a user and is configured to implement at least one additive manufacturing process for the additive manufacturing of at least one specific component having defined component properties on the basis of at least one provided certified data record. All the configurations relating to the method for the additive manufacturing of a component having defined component properties apply by analogy to the system and vice versa.

The system, i.e. in particular the provision apparatus, may also be configured to provide a certified data record which contains component-specific parameters and/or system-specific parameters and/or process-specific parameters certified by a provider for preparing an additive manufacturing process of the or at least one specific component having defined component properties. Of course, the system can also be configured to implement at least one measure for preparing the or at least one additive manufacturing process for the additive manufacturing of at least one specific component having defined component properties on the basis of the certified data record. For this purpose, the system may comprise suitable apparatuses, i.e. temperature-control apparatuses, drying apparatuses, inerting apparatuses, etc., for example, for carrying out corresponding preparatory measures.

The system may also comprise at least one, in particular optical detection apparatus, i.e. a camera, for example. In this case, the system may be configured to carry out a comparison of at least one parameter that is detected by means of the at least one detection apparatus as part of the additive manufacturing of the at least one component to be additively manufactured and having defined component properties and relates to the additive manufacturing of the at least one component to be additively manufactured with at least one, in particular corresponding, reference parameter, which is in particular a system-specific parameter and/or a component-specific parameter and/or a process-specific parameter described by the at least one certified data record. Therefore, a current additive manufacturing process can be checked against the additive manufacturing process described by the at least one certified data record. In this way, an additive manufacturing process taking place on the basis of the at least one certified data record can be monitored.

The system may also comprise an evaluation apparatus implemented with hardware and/or software. The system, i.e. in particular the at least one evaluation apparatus, may be configured to evaluate the comparison information with regard to at least one evaluation criterion, in particular whether said criterion demonstrates that the parameter has exceeded or fallen below at least one parameter-specific limit value or limit-value range, and to generate evaluation information describing the relevant evaluation result. The evaluation information may in particular indicate whether or to what extent the additively manufactured component satisfies or does not satisfy at least one evaluation criterion, in particular defined by the at least one limit value or limit-value range. The output can be carried out by outputting corresponding evaluation information to an in particular acoustic and/or optical and/or haptic output apparatus, i.e. a display, for example, and/or by transmitting corresponding evaluation information in the form of data to at least one communication partner. The system may therefore also comprise at least one corresponding output apparatus.

The system, i.e. in particular the provision apparatus, may also be configured to provide a certified data record which contains component-specific parameters and/or system-specific parameters and/or process-specific parameters certified by a provider for the post-processing of the or at least one additive manufacturing process of at least one specific component having defined component properties. Of course, the system can also be configured to implement at least one measure for the post-processing of the or at least one additive manufacturing process for the additive manufacturing of at least one specific component having defined component properties on the basis of the certified data record. For this purpose, the system may comprise suitable apparatuses, i.e. thermal treatment apparatuses, mechanical processing apparatuses, etc., for example, for carrying out corresponding post-processing measures.

The system, i.e. in particular the at least one additive manufacturing apparatus, may be configured such that at least one additive manufacturing process for the additive manufacturing of the at least one specific component having defined component properties is implemented on the basis of the certified data record by means of a user-side additive manufacturing apparatus in a fully automated manner, in particular without any user-side intervention.

The system may comprise an authorisation apparatus implemented with hardware and/or software for authorising a (potential) certified data record provided by a user or a third party. The authorisation apparatus is in particular configured to check corresponding information from the user or the third party with regard to at least one authorisation criterion that is predetermined or can be predetermined by the provider and to only authorise said information as a certified data record when positively authorised by the provider.

The system, i.e. in particular the provision apparatus, may be configured with hardware and/or software to configure the at least one certified data record such that it contains a certain number of additive manufacturing processes that are possible on the basis of the certified data record by means of a certain additive manufacturing device.

The system, i.e. in particular the provision apparatus, may be configured with hardware and/or software to configure the at least one certified data record such that the at least one certified data record, in particular its contents, cannot be modified by a user.

The system, i.e. in particular the provision apparatus, may be configured with hardware and/or software to configure the at least one certified data record such that the at least one certified data record is encrypted.

The system may comprise a data memory, in particular a server, optionally a cloud server, that is or can be connected to at least one communication network, on which memory or server the at least one certified data record can be provided and from which the at least one certified data record is or can be retrieved by a user.

The at least one certified data record may be configured with hardware and/or software such that the at least one certified data record can be retrieved by a user if payment information describing a successful payment process by the user is available, in particular on the data-memory side.

The system may also comprise a user-side access portal, such that the at least one certified data record is or can be retrieved on the user-side access portal.

The at least one certified data record and/or a user-side access portal may be provided on a portable data carrier that is or can be delivered to a user, in particular as a plug-in solution, from which data carrier said data record is or can be retrieved by a user.

The system may also comprise at least one in particular provider-side and/or user-side output apparatus, i.e. in particular an output apparatus designed as a display, for example, such that, as part of implementing the at least one additive manufacturing process for the additive manufacturing of the or at least one specific component having defined component properties on the basis of the certified data record on the output apparatus, at least one status display relating to the status of the relevant additive manufacturing process is or can be generated.

The at least one additive manufacturing apparatus may e.g. be configured to carry out an additive manufacturing process in which a plastics-based construction material is used for the additive manufacturing of the at least one component. In particular, the at least one additive manufacturing apparatus may be designed as or may comprise a fused deposition modelling (FDM) apparatus. Of course, differently configured additive manufacturing apparatuses are likewise conceivable.

The invention is explained in greater detail on the basis of embodiments in the drawings, in which:

FIGS. 1 and 2 are each schematic views of a system for the additive manufacturing of a component having defined component properties according to an embodiment;

FIG. 4 is a schematic view of a user interface of a user-side access portal; and FIG. 5 is a schematic view of a status display.

Figure 3:
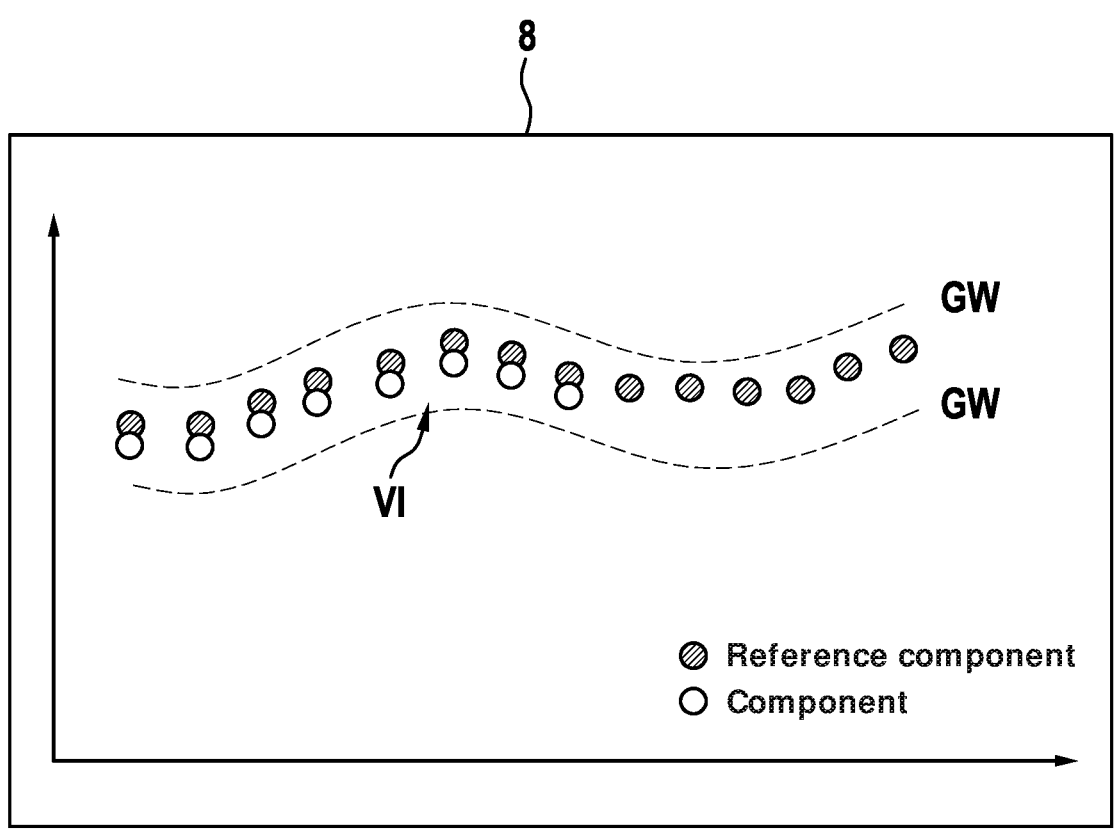
FIG. 3 is a schematic view of evaluation information that can be output to an output apparatus.

FIG. 1 is a schematic view of a system 1 for the additive manufacturing of at least one specific component 2 having defined component properties. The system 1 comprises a provision apparatus 3 that is or can be assigned to a provider and is implemented with hardware and/or software, which is configured to provide at least one certified data record 4, which contains system-specific parameters and/or component-specific parameters and/or process-specific parameters certified by the provider for the additive manufacturing of at least one specific component 2 having defined component properties, and an additive manufacturing apparatus 5 that is or can be assigned to a user and is configured to implement an additive manufacturing process for the additive manufacturing of a specific component having defined component properties on the basis of a provided certified data record 4.

The system 1 is configured for carrying out a method for the additive manufacturing of a component 2 having defined component properties, which method is explained in greater detail in the following.

By means of the system 1 and the method that can be implemented by the system 1, the various components 2 or component groups can be additively manufactured in principle. In particular, technical components or component groups can be additively manufactured. In this context, both newly constructed technical components 2 or component groups and replacement or retrofit components or replacement or retrofit component groups for a certain technical apparatus, such as a machine, are additively manufactured. Examples of technical fields in which components 2 or component groups manufactured according to the method and thus also the method can be used are the fields of automation, robotics, handling, packaging, etc. Therefore, according to the method, components or component groups for automation apparatuses, robotics apparatuses, handling apparatuses and packaging apparatuses can be additively manufactured, for example. Specifically, such components 2 or component groups may e.g. be handling elements, such as gripping elements, suction elements, etc. Respective components 2 or component groups can be manufactured to have at least one additional function, for example formed by internal structures, such as temperature-control duct structures, through which a temperature-control medium can flow, flow-duct structures, through which a flow medium can flow, etc.

The method comprises the following steps, which are described in greater detail in the following:

In a first step of the method, by means of the provision apparatus 3, a certified data record 4 is provided which contains system-specific parameters and/or component-specific parameters and/or process-specific parameters certified by a provider for an additive manufacturing process of at least one specific component 2 having defined component properties. In the first step of the method, by means of the provision apparatus 3, at least one certified data record 4 is therefore provided, which record contains certified system-specific parameters and/or component-specific parameters and/or process-specific parameters for an additive manufacturing process of at least one component 2 having defined component properties. The first step is typically carried out by a provider.

The certified data record 4 typically contains all the required system-specific parameters and/or component-specific parameters and/or process-specific parameters that are required for the additive manufacturing of a specific component 2 having defined component properties. In other words, all the system-specific information and/or component-specific information and/or process-specific information for the additive manufacturing of a relevant specific component 2 having defined component properties, i.e. in particular also machine-readable control information for controlling and/or regulating the operation of the additive manufacturing apparatus 5 used for carrying out an additive manufacturing process for the additive manufacturing of the relevant component 2 having defined component properties, is provided in the certified data record 4.

Therefore, a separate certified data record 4 can be provided for any component 2 that is manufactured or is to be manufactured according to the method. This is therefore in particular the case when certain system-specific parameters and/or component-specific parameters and/or process-specific parameters are required for producing specific component properties, therefore specific component properties can be correlated with certain system-specific parameters and/or component-specific parameters and/or process-specific parameters, such that only a certain combination of system-specific parameters and/or component-specific parameters and/or process-specific parameters allows for reliable and reproducible additive manufacturing of a component 2 having defined component properties. It follows that the certified data record 4 typically contains a certain combination of system-specific parameters and/or component-specific parameters and/or process-specific parameters for the production of a specific component 2 having defined component properties.

In this case, a certain combination of corresponding parameters contained in the certified data record 4 typically relates to a certain additive manufacturing process for a specific component 2 having defined component properties, which process can be carried out using a certain additive manufacturing apparatus 5. The certified data record 4 therefore typically contains a customised combination of system-specific parameters and/or component-specific parameters and/or process-specific parameters for a certain additive manufacturing process that can be carried out using a certain additive manufacturing apparatus 5, which combination allows for reliable and reproducible additive manufacturing of a component 2 having defined component properties. Therefore, certified data records 4 for manufacturing components 2 having the same defined component properties can nevertheless differ in at least one system-specific parameter and/or component-specific parameter and/or process-specific parameter if these parameters are taken as basis for different additive manufacturing processes and/or the operation of different additive manufacturing apparatuses 5.

As part of carrying out the method, a user of the method who wants to perform additive manufacturing of a component 2 having defined component properties provides the certified data record 4 provided to them by the provision apparatus 3 to the additive manufacturing apparatus 5 used for carrying out an additive manufacturing process for the additive manufacturing of the relevant component 2 having defined component properties, whereupon the additive manufacturing process for manufacturing the relevant component 2 having defined component properties can be carried out without user-side intervention, in particular fully automatically, solely on the basis of the certified data record 4. At least one additive manufacturing process for the additive manufacturing of at least one specific component 2 having defined component properties can therefore be implemented on the basis of the certified data record 4 by means of the user-side additive manufacturing apparatus 5 in a fully automated manner, in particular without any user-side intervention.

As already indicated, the certified data record 4 may also contain machine-readable control information for the in particular fully automatic control and/or regulation of the operation of the additive manufacturing apparatus 5 for the additive manufacturing of the component 2 to be additively manufactured on the basis of the certified data record 4. The corresponding control information may e.g. be a relevant machine code (G-code) of the additive manufacturing apparatus 5. Corresponding control information may be described directly or indirectly by corresponding system-specific parameters and/or component-specific parameters and/or process-specific parameters contained in the certified data record 4.

For the additive manufacturing of the component 2 having defined component properties, a user therefore only requires an additive manufacturing apparatus 5 and a corresponding certified data record 4, which is provided in the form of data to the additive manufacturing apparatus 5, i.e. typically to a controller 6 that is implemented with hardware and/or software and controls or regulates the operation of the additive manufacturing apparatus.

A user of the method therefore does not have to compile corresponding parameters which allow them to carry out reliable and reproducible additive manufacturing of a relevant component 2 having defined component properties, since all the parameters are already contained in the certified data record 4 taken as a basis for the additive manufacturing process. A user of the method also does not need their own experience or knowledge in the field of additive manufacturing, since all the "knowledge" regarding the additive manufacturing of a relevant component 2 having defined component properties sought by the user is contained in the at least one certified data record 4.

Before the first step, a provider can define corresponding certified system-specific parameters and/or component-specific parameters and/or process-specific parameters for an additive manufacturing process and can combine or can have combined said parameters in a corresponding certified data record 4 in the form of data. Therefore, defining corresponding system-specific parameters and/or component-specific parameters and/or process-specific parameters and combining said parameters in a corresponding certified data record 4 can also constitute a step of the method.

In a second step of the method, an additive manufacturing process for the additive manufacturing of a specific component 2 having defined component properties is implemented on the basis of the certified data record 4 provided in the first step.

In the second step, all the additive manufacturing processes, i.e. in particular all the additive manufacturing processes based on a powder (bed) and all the additive manufacturing processes not based on a powder (bed), can be implemented in principle. An additive manufacturing process that is specifically implemented in the second step is in particular defined by the system-specific parameters and/or process-specific parameters contained in the respectively used certified data record 4.

In the second step, depending on the additive manufacturing process that is specifically implemented, different construction materials, i.e. metals, plastics materials, etc., for example, can be processed in principle. Accordingly, in the second step, an additive manufacturing process can e.g. be implemented in which a metal-based or plastics-based construction material is processed or used for the additive manufacturing of the component 2. In particular, in the second step, a fused deposition modelling (FDM) process can be implemented, in which a plastics-based construction material is used for the additive manufacturing of the component 2. FDM processes are characterised by a comparatively high construction rate together with very good component properties. The method can, however, also be implemented using other additive manufacturing processes, such as binder jetting processes, digital light synthesis processes, CLIP processes, SLM processes, SLS processes, SEBM processes, stereolithography processes, etc.

The method may also include providing a certified data record 4' which contains system-specific parameters and/or component-specific parameters and/or process-specific parameters certified by a provider for preparing an additive manufacturing process of the or at least one specific component 2 having defined component properties, and implementing at least one measure for preparing the or at least one additive manufacturing process for the additive manufacturing of a specific component 2 having defined component properties on the basis of the certified data record 4'. A user therefore (also) does not need their own experience or knowledge of a corresponding preparatory measure, since all the "knowledge" required for this purpose can be contained in the certified data record 4'.

The at least one measure for preparing the additive manufacturing process implemented on the basis of the at least one certified data record 4' may e.g. include a measure for preparing a construction material to be used as part of the additive manufacturing process carried out for the additive manufacturing of a component 2 having specific component properties, in particular temperature control, drying, inerting, etc., of the construction material. The measure is typically selected with regard to an additive manufacturing process to be specifically implemented or a construction material that is specifically used as part of carrying out an additive manufacturing process to be specifically implemented. For example, additive manufacturing processes based on a powder (bed) may require different preparatory measures from additive manufacturing processes not based on a powder (bed).

The method may also include providing a certified data record 4" which contains system-specific parameters and/or component-specific parameters and/or process-specific parameters certified by a provider for the post-processing of the or at least one additive manufacturing process of a specific component 2 having defined component properties, and implementing at least one measure for the post-processing of the or at least one additive manufacturing process for the additive manufacturing of a specific component having defined component properties on the basis of the certified data record 4". A user therefore (also) does not need their own experience or knowledge of a corresponding post-processing measure, since all the "knowledge" required for this purpose can be contained in the certified data record 4".

The at least one measure for the post-processing of the additive manufacturing process may include a measure for the post-processing of the component 2 additively manufactured as part of the additive manufacturing process implemented on the basis of the at least one certified data record, in particular mechanical and/or thermal post-treatment of the additively manufactured component 2, such as mechanical surface processing at least in portions for producing certain surface properties, thermal treatment at least in portions for producing certain structural properties, etc. The measure is typically selected with regard to a specifically implemented additive manufacturing process or a construction material that is specifically used as part of carrying out a specifically implemented additive manufacturing process. For example, components 2 manufactured by means of additive manufacturing processes based on a powder (bed) may require different post-processing measures from components 2 manufactured by means of additive manufacturing processes not based on a powder (bed). In the same way, components 2 manufactured from metal may require different post-processing measures from components 2 manufactured from plastics material.

It is likewise conceivable for a certified data record 4, 4', 4" to contain both system-specific parameters and/or component-specific parameters and/or process-specific parameters certified by a provider for an additive manufacturing process of at least one specific component having defined component properties and system-specific parameters and/or component-specific parameters and/or process-specific parameters certified by a provider for the preparation and/or post-processing of an additive manufacturing process of the or at least one specific component having defined component properties.

In the following, examples of component-specific parameters that are or can be certified, in particular by a provider, and can be contained in a certified data record 4 are provided in a non-exhaustive list.

The certified data record 4 may e.g. contain at least one geometric-structural parameter of the at least one component 2 to be additively manufactured, in particular all the geometric-structural parameters of the at least one component 2 to be additively manufactured, as component-specific parameters. The certified data record 4 may therefore contain one or more, in particular all the, geometric-structural parameters, i.e. dimensions, shape, volume, etc., for example, of the component 2 to be additively manufactured. The geometric-structural properties of the component 2 to be additively manufactured and the resulting structural and functional configuration of the component 2 to be additively manufactured can therefore be defined by the certified data record 4, in particular completely.

Alternatively or additionally, the certified data record 4 may contain at least one chemical parameter of the component 2 to be additively manufactured, in particular all the chemical parameters of the component 2 to be additively manufactured, as component-specific parameters. The certified data record 4 may therefore contain one or more, in particular all the, chemical parameters, i.e., for example, chemical ageing, in particular in certain chemical environments, chemical reactivity, in particular in certain chemical environments, chemical compatibility with certain media, chemical composition, etc., of the component 2 to be additively manufactured. The chemical properties of the component 2 to be additively manufactured can therefore be defined by the certified data record 4, in particular completely.

Alternatively or additionally, the certified data record 4 may contain at least one physical parameter of the component 4 to be additively manufactured, in particular all the physical parameters of the component 4 to be additively manufactured, as component-specific parameters. The certified data record 4 may therefore contain one or more, in particular all the, geometric-structural parameters, i.e., for example, electrical parameters, such as electrical conductivity, mechanical parameters, such as strength, hardness, ductility, etc., thermal parameters, such as thermal conductivity, thermal capacity, etc., tribological parameters, such as roughness, and other physical parameters, such as density, mass, etc., of the component 2 to be additively manufactured. The physical properties of the component 2 to be additively manufactured can therefore be defined by the certified data record 4, in particular completely.

In the following, examples of system-specific parameters that are or can be certified, in particular by a provider, and can be contained in the certified data record 4 are provided in a non-exhaustive list.

The certified data record 4 may e.g. contain at least one dimensional parameter, such as length, width, shape, etc., of at least one construction field or construction plane of an additive manufacturing apparatus 5 that is used or is to be used for the additive manufacturing of the component 2 to be additively manufactured, in particular all the dimensional parameters of at least one construction field of an additive manufacturing apparatus 5 that is used or is to be used for the additive manufacturing of the component 2 to be additively manufactured, as system-specific parameters. The dimensions of at least one construction field or construction plane of an additive manufacturing apparatus 5 that is used or is to be used for the additive manufacturing of the component 2 to be additively manufactured can therefore be defined by the certified data record 4, in particular completely.

Alternatively or additionally, the certified data record 4 may contain at least one dimensional parameter, such as length, width, height or depth, or spatial form, of at least one construction volume of an additive manufacturing apparatus 5 that is used or is to be used for the additive manufacturing of the component 2 to be additively manufactured, in particular all the dimensional parameters of at least one construction volume of an additive manufacturing apparatus 5 that is used or is to be used for the additive manufacturing of the component 2 to be additively manufactured, as system-specific parameters. The dimensions of at least one construction volume of an additive manufacturing apparatus 5 that is used or is to be used for the additive manufacturing of the component 2 to be additively manufactured can therefore be defined by the certified data record 4, in particular completely.

Alternatively or additionally, the certified data record 4 may contain at least one manufacturing parameter, such as a construction-rate parameter influencing the construction rate, a feed parameter influencing a material feed process of an in particular strand-like or strand-shaped construction material to be selectively arranged in a construction field or construction plane, an application or coating parameter influencing an application or coating process of an in particular powder-like or powder-shaped construction material to be applied in a construction field, an exposure or irradiation parameter influencing an exposure or irradiation process of a construction material that is to be exposed or irradiated and is applied in a construction field by means of at least one energy beam, such as an electron beam or laser beam, in particular for the purpose of selective hardening and/or for the purpose of the selective temperature control of the construction material, i.e., for example, energy-beam number, energy-beam intensity or power, energy-beam focal length, energy-beam focal position, etc., of an additive manufacturing apparatus 5 that is used or is to be used for the additive manufacturing of the component 2 to be additively manufactured, in particular all the manufacturing parameters of an additive manufacturing apparatus 5 that is used or is to be used for the additive manufacturing of the component 2 to be additively manufactured, as system-specific parameters. The manufacturing parameters of an additive manufacturing apparatus 5 that is used or is to be used for the additive manufacturing of the component 2 to be additively manufactured can therefore be defined by the certified data record 4, in particular completely.

Alternatively or additionally, the certified data record 4 may contain at least one system-type parameter, in particular a series parameter, model parameter, type parameter and/or manufacturer parameter, of an additive manufacturing apparatus 5 that is used or is to be used for the additive manufacturing of the component 2 to be additively manufactured, in particular all the system-type parameters of an additive manufacturing apparatus 5 that is used or is to be used for the additive manufacturing of the component 2 to be additively manufactured, as system-specific parameters. The system-type parameters of an additive manufacturing apparatus 5 that is used or is to be used for the additive manufacturing of the component 2 to be additively manufactured can therefore be defined by the certified data record 4, in particular completely.

In the following, examples of process-specific parameters that are or can be certified, in particular by a provider, and can be contained in the certified data record 4 are provided in a non-exhaustive list.

The certified data record 4 may contain at least one construction-material parameter, in particular the chemical and/or physical composition of a construction material, the powder-size distribution and/or powder morphology of a construction-material powder, if a powder-like or powder-shaped construction material is used, dimensions or cross-sectional geometry of a construction-material strand, if a strand-like or strand-shaped construction material is used, the viscosity of a liquid construction material, if a liquid construction material is used, the degree of purity or the recycled proportion of a construction material, the mixing ratio of a construction material, if a construction material comprising a plurality of different construction-material components is used, etc., of at least one construction material which is or can be used for the additive manufacturing by at least one additive manufacturing apparatus 5 that is used or is to be used for the additive manufacturing of the component 2 to be additively manufactured, in particular all the construction-material parameters of at least one construction material which can be used for the additive manufacturing by an additive manufacturing apparatus 5 that is used or is to be used for the additive manufacturing of the component 2 to be additively manufactured, as process-specific parameters. The construction-material parameters of at least one construction material that is used or is to be used for the additive manufacturing of the component 2 to be additively manufactured can therefore be defined by the certified data record 4, in particular completely.

Alternatively or additionally, the certified data record 4 may contain at least one chemical process parameter, in particular a chemical atmosphere, such as an inert atmosphere, inside at least one construction and/or process area or volume of an additive manufacturing apparatus 5 that is used or is to be used for the additive manufacturing of the component 2 to be additively manufactured, in particular all the chemical process parameters of at least one construction and/or process area or volume of an additive manufacturing apparatus 5 that is used or is to be used for the additive manufacturing of the component 2 to be additively manufactured, as process-specific parameters. The chemical process parameters inside at least one construction and/or process area or volume of an additive manufacturing apparatus 5 that is used or is to be used for the additive manufacturing of the component 2 to be additively manufactured can therefore be defined by the certified data record 4, in particular completely.

Alternatively or additionally, the certified data record 4 may contain at least one physical process parameter, in particular moisture, pressure, temperature, etc., outside and/or inside at least one construction and/or process area or volume of an additive manufacturing apparatus 5 that is used or is to be used for the additive manufacturing of the component 2 to be additively manufactured, in particular all the physical process parameters of at least one construction and/or process area of an additive manufacturing apparatus 5 that is used or is to be used for the additive manufacturing of the component 2 to be additively manufactured, as process-specific parameters. The physical process parameters outside and/or inside at least one construction and/or process area or volume of an additive manufacturing apparatus 5 that is used or is to be used for the additive manufacturing of the component 2 to be additively manufactured can therefore be defined by the certified data record 4, in particular completely.

Alternatively or additionally, the certified data record 4 may contain at least one climatic process parameter, in particular moisture, pressure, temperature, outside and/or inside at least one environment of an additive manufacturing apparatus 5 that is used or is to be used for the additive manufacturing of the component 2 to be additively manufactured, in particular all the climatic process parameters of an additive manufacturing apparatus 5 that is used or is to be used for the additive manufacturing of the component 2 to be additively manufactured, as process-specific parameters. The climatic process parameters outside and/or inside at least one environment of an additive manufacturing apparatus 4 that is used or is to be used for the additive manufacturing of the component 2 to be additively manufactured can therefore be defined by the certified data record 4, in particular completely.

Alternatively or additionally, the certified data record 4 may contain at least one layer parameter (slice parameter), such as layer number, layer thickness, layer surface, etc., describing a division of the component 2 to be additively manufactured into individual layers each containing a cross section of the component 2 to be additively manufactured, in particular all the layer parameters describing a division of the component 2 to be additively manufactured into individual layers each containing a cross section of the component 2 to be additively manufactured, as process-specific parameters. The layer parameters (slice parameters) can therefore be defined by the certified data record 4, in particular completely.

Alternatively or additionally, the certified data record 4 may contain at least one parameter, in particular a geometric-structural parameter and/or an arrangement parameter and/or orientation parameter relative to a component 2 to be supported that is to be additively manufactured or has been additively manufactured, of at least one support element serving to support the component 2 that is to be additively manufactured or has been additively manufactured, in particular all the parameters of at least one support element serving to support the component 2 that is to be additively manufactured or has been additively manufactured, as process-specific parameters. The parameters of at least one support element serving to support the component 2 that is to be additively manufactured or has been additively manufactured can therefore be defined by the certified data record 4, in particular completely.

Alternatively or additionally, the certified data record 4 may contain at least one construction-strategy parameter describing a construction strategy, i.e. in particular a construction-material application strategy, an exposure or irradiation strategy, etc., for the component 2 to be additively manufactured, in particular all the construction-strategy parameters describing a construction strategy for the component 2 to be additively manufactured, as process-specific parameters. The construction-strategy parameters describing a construction-strategy parameter for the component 2 to be additively manufactured can therefore be defined by the certified data record 4, in particular completely.

As mentioned above, the certified data record 4 may contain at least one geometric-structural parameter, in particular all the geometric-structural parameters, of at least one support element serving to support the component 2 that is to be additively manufactured or has been additively manufactured as process-specific parameters. In this case, the at least one support element may be provided with at least one structural element that facilitates removal of the at least one support element from the additively manufactured component 2, in particular a weakening of the at least one support element, e.g. produced by a predetermined breaking point, and/or may be provided with a marker that visually highlights the support element to be removed, e.g. in colour, contrasting with the additively manufactured component 2. In connection with corresponding structural elements to be formed, information can also be contained in the certified data record 4 which relates to the subsequent handling, i.e. in particular the removal of support elements, of a component 2 additively manufactured on the basis of the certified data record 4 when this information contains the in particular additive formation of corresponding structural elements.

In an embodiment, at least one parameter P that is detected by means of an e.g. optical detection apparatus 7 as part of the additive manufacturing of the component 2 to be additively manufactured and having defined component properties and relates to the additive manufacturing of the component 2 to be additively manufactured can be compared with at least one, in particular corresponding, reference parameter RP, which is in particular a system-specific parameter and/or a component-specific parameter and/or a process-specific parameter described by the certified data record 4. Therefore, an additive manufacturing process that is currently being carried out can be checked against an additive manufacturing process described by the certified data record 4, in particular in real time. In this way, an additive manufacturing process taking place on the basis of the certified data record 4 can be monitored.

In this embodiment, the comparison information VI can also be evaluated with regard to at least one evaluation criterion, in particular whether said criterion demonstrates that the parameter has exceeded or fallen below at least one parameter-specific limit value or limit-value range, and evaluation information describing the relevant evaluation result can be generated. The evaluation information may in particular indicate whether or to what extent the additively manufactured component 2 satisfies or does not satisfy at least one evaluation criterion, in particular defined by the at least one limit value GW or limit-value range. As shown by way of example in FIG. 3, the output can be carried out by outputting corresponding evaluation information to an in particular acoustic and/or optical and/or haptic output apparatus 8, i.e. a display, for example, and/or by transmitting corresponding evaluation information in the form of data to at least one communication partner.

In an embodiment, the certified data record 4 can be or can have been generated by the provider. In this case, the certified data record 4 can be or can have been generated by the provider e.g. on the basis of information from the provider, in particular on the basis of manufacturing results for a reference component corresponding to the component 2 to be additively manufactured, which results are optionally empirically or iteratively obtained by the provider, preferably under defined manufacturing conditions. The certified data record 4 can therefore be based on the additive manufacturing of a reference component having defined component properties which (exactly) correspond to the component properties of a component 2 to be manufactured according to the method. Therefore, the system-specific parameters and/or component-specific parameters and/or process-specific parameters on the basis of which a specific reference component having defined component properties has been manufactured in a reliable and reproducible manner, i.e. in particular all the system-specific parameters and/or component-specific parameters and/or process-specific parameters on the basis of which a specific reference component having defined component properties has been manufactured in a reliable and reproducible manner, can be used as a certified data record 4 for the additive manufacturing of a component 2 to be additively manufactured that (exactly) corresponds to the reference component or can be contained in the at least one certified data record 4. In other words, the system-specific parameters and/or component-specific parameters and/or process-specific parameters contained in the certified data record 4 can be considered to be parameters that have been tested out under certain system-specific and/or component-specific and/or process-specific circumstances, typically likewise represented by the certified data record 4, as part of the additive manufacturing of a specific reference component having defined component properties. The aspect already mentioned above that a user of the method does not have to compile corresponding parameters themselves which allow them to carry out reliable and reproducible additive manufacturing of a relevant component 2 having defined component properties, since all the parameters are already contained in the certified data record 4 taken as a basis for the additive manufacturing process, follows from the above.

In another embodiment, however, the certified data record 4 also can be or can have been originally generated by a user or a third party, this being a natural person or legal entity that provides corresponding data records as an external service provider without wanting to manufacture additive components 2 themselves. It is therefore conceivable for the certified data record 4 to be or to have been generated by the user or the third party on the basis of information from the user or the third party, in particular on the basis of manufacturing results for a reference component (exactly) corresponding to the component 2 to be additively manufactured, which results are optionally empirically or iteratively obtained by the user or the third party, preferably under defined manufacturing conditions.

In this embodiment, the information provided by the user or the third party as a (potential) certified data record is, however, checked by the provider with regard to at least one authorisation criterion that is predetermined or can be predetermined by the provider, i.e. a safety criterion, quality criterion, etc., and is only authorised as a certified data record when positively authorised by the provider. For this purpose, an authorisation apparatus 9 implemented with hardware and/or software can be used.

In an embodiment, the check may include comparing at least one system-specific parameter and/or component-specific parameter and/or process-specific parameter contained in the data record to be authorised with at least one system-specific reference parameter and/or component-specific reference parameter and/or process-specific reference parameter in particular corresponding to the above and generating comparison information describing the relevant comparison result.

In an embodiment, the authorisation may also include evaluating the comparison information with regard to at least one evaluation criterion, in particular whether said criterion demonstrates that the parameter has exceeded or fallen below at least one parameter-specific limit value or limit-value range. For example, a component-specific limit value or limit-value range may relate to certain geometric-structural, chemical and/or physical properties, with authorisation only being provided if these are observed. A safety criterion or quality criterion can be defined by a corresponding limit value or limit-value range.

In an embodiment, the authorisation may also include outputting at least one piece of evaluation or authorisation information describing the evaluation or authorisation result. The output of corresponding evaluation or authorisation information can be carried out via an in particular acoustic and/or optical and/or haptic output apparatus 8, i.e. a display, for example, and/or by transmitting corresponding evaluation or authorisation information in the form of data to at least one communication partner.

In another embodiment, the certified data record 4 may contain a certain number, in particular a maximum number, of additive manufacturing processes that are possible on the basis of the certified data record 4 by means of a certain additive manufacturing device 5. In the certified data record 4, it can therefore be determined how many components 2 to be additively manufactured can be additively manufactured on the basis of the certified data record 4 as a maximum. The certified data record 4 may accordingly be configured in terms of hardware and/or software such that only a certain number of components 2 having defined component properties can be manufactured thereby. In this way, the provider has the option of controlling the use of the certified data record 4, which can also be an effective measure against unauthorised use of the certified data record 4.

In another embodiment, the certified data record 4, in particular the system-specific parameters and/or component-specific parameters and/or process-specific parameters contained therein, cannot be modified by a user. The certified data record 4 may accordingly be configured in terms of hardware and/or software, i.e. in particular protected against modifications by the user, such that a user cannot make any modifications to the certified data record 4. This can be implemented e.g. by write protection of the parameters contained in the certified data record 4. The certified data record 4 can be protected against undesired manipulation in this way.

In another embodiment, the certified data record 4 can be encrypted. The certified data record 4 may accordingly be configured in terms of hardware and/or software such that a key is required for it to be used. A user can therefore only use the certified data record 4 if they have a corresponding key for decryption. A corresponding key can be provided to a user by the provider. The provision of a corresponding key may be linked to payment information describing a successful payment process by the user being available.

In another embodiment, the certified data record 4 may be provided by the provider on a data memory 10, in particular a server, optionally a cloud server, that is or can be connected to at least one communication network, merely schematically indicated by the arrow 11, from which memory or server said data record is or can be retrieved by a user.

A corresponding data memory 10 can be assigned to the provider; a corresponding data memory 10 can therefore be provided in the region of a data or communication infrastructure managed by the provider. The communication network 11 may be a global or local communication network, therefore the internet or an intranet, for example. By providing the certified data record 4 on a corresponding data memory 10, in principle this can allow a user to retrieve said data record from any location and at any time. Any communication connection established between the data memory 10 and the user can be encrypted.

In another embodiment, the certified data record 4 can be retrieved from the at least one data memory 10 via a data-memory-side user interface that optionally is or can be configured in a user-customised manner. A corresponding user interface can be accessed by a user login procedure. All the user-side interactions with the data memory 10 can take place e.g. via web-based applications, such as particular software (apps), browsers, etc., implemented in user-side (portable) devices, such as computers, laptops, smartphones, tablets, smartwatches, smart glasses, etc.

In another embodiment, the certified data record 4 may (only) be retrieved by a user if payment information describing a (successful) payment process by the user is available, in particular on the data-memory side. A payment process may be a payment process for one-time access to the data memory 10 for retrieving at least one specific certified data record 4. A payment process may, however, in the sense of a subscription, also be a payment process for repeated access to the data memory 10 for retrieving at least one specific certified data record 4 within a certain time period, i.e., for example, at least an hour, at least a day, at least a month, at least a year, etc.

In principle, a payment process can be performed in any manner. The user can e.g. conventionally perform payment processes by transferring a certain amount of money to the provider's bank account or, using suitable payment services, to a virtual payment receiver, i.e. via an internet-based payment portal, for example. It is also conceivable for a corresponding payment service to be integrated in a data-memory-side user interface, e.g. optionally as a separate user sub-menu. Alternatively or additionally, a corresponding payment service may e.g. also be implemented as software (an app) for a user-side (portable) device, e.g. a computer, laptop, smartphone, tablet, smartwatch, smart glasses, etc.

In another embodiment, the certified data record 4 can be retrieved or stored on a user-side access portal 12, from which it can then be retrieved on a user-side additive manufacturing apparatus 5. Therefore, a user (independently of the provider in this respect) can set up an access portal 12 in its own data or communication infrastructure managed on the user side, from which portal certified data records 4 can be retrieved on at least one user-side additive manufacturing apparatus 5. By means of the user-side access portal 12, (only) those certified data records 4 can therefore be provided and retrieved which are relevant for the user in question, e.g. on the basis of a specific component program in the user's technical equipment. For example, by means of an access portal 12 of a user from the field of packaging technology, only those certified data records can be provided and retrieved which relate to components 2 that are actually constructed in the user's packaging machines. A corresponding access portal 12 can be provided as a plug-in solution, which is optionally web-based, for a data or communication infrastructure managed on the user side, such that a data or communication infrastructure managed on the user side can be upgraded with a corresponding access portal 12 in a simple manner.

An embodiment of an exemplary user interface of a corresponding access portal 12 is shown in FIG. 4. In particular, by way of example, this figure shows a possible table-like representation of the components 2 that can be additively manufactured (first column from the left), the associated component names (second column from the left), the associated models (third column from the left), the available additive manufacturing apparatuses 5 ("printers") (fourth column from the left) and the option of downloading the respective certified data records 4 onto a relevant additive manufacturing apparatus 5 (fifth column from the left). In connection with the column relating to the selection of an additive manufacturing apparatus 5, it can be added by way of example that drop-down menus can be implemented, via which a user can make a selection, in this case of an additive manufacturing apparatus 5.

In another embodiment, the certified data record 4 stored on a user-side access portal 12 can be retrieved on the additive manufacturing apparatus 5 of a customer of the user. This may in turn be linked to payment information describing a payment process by a customer of the user to the user and/or provider being available.

In another embodiment, the certified data record 4 and/or a user-side access portal 12 can be provided on a portable data carrier that is or can be delivered to a user and is in particular capable of communicating or being networked, such as a USB stick, CD ROM, memory card, etc., in particular as a plug-in solution, which is optionally web-based, from which data carrier said data record is or can be retrieved by a user.

A corresponding data carrier that is capable of communicating or being networked can be configured to transmit data relating to the additive manufacturing process, i.e. status data, error data, etc., for example, to a communication partner, i.e. the provider, for example. This data can again be transmitted in an encrypted manner.

A corresponding data carrier can be delivered to a user if payment information describing a payment process by the user is available. The above comments in connection with corresponding payment information and payment processes apply by analogy.

In another embodiment, as part of implementing the at least one additive manufacturing process for the additive manufacturing of the component 2 having defined component properties on the basis of the certified data record 4 on an in particular provider-side and/or user-side output apparatus 8, at least one status display relating to the status of the relevant additive manufacturing process can be generated and output. By means of a corresponding status display, an additive manufacturing process carried out on the basis of the certified data record 4 can be monitored, optionally in real time.

An embodiment of a corresponding status display is shown in FIG. 5 by way of example. In particular, by way of example, this figure shows a possible table-like representation of the component 2 to be additively manufactured (first column from the left), the associated component name (second column from the left), the associated name of an additive manufacturing apparatus 5 used (third column from the left), the associated status (fourth column from the left) and the remaining duration of the additive manufacturing process (fifth column from the left).

Individual features, multiple features or all the features described in connection with a particular embodiment may be combined with individual features, multiple features or all the features of at least one other embodiment in any way.

The invention claimed is:

1. A method for additively manufacturing of at least one component having defined component properties, comprising:
   providing, by a provider of certified data records, at least one certified data record which comprises component-specific parameters, system-specific parameters and process-specific parameters certified by the provider for an additive manufacturing process of at least one defined component having defined component properties, wherein the at least one certified data record defines exact component properties of a reference component having the defined component properties of the defined component to be additively manufactured, the reference component having been previously produced under defined additive manufacturing conditions;

storing the at least one certified data record on a data storage, the at least one certified data record being retrievable from the data storage by a user via a user-side access portal operatively connected to at least one additive manufacturing apparatus of the user, wherein the at least one certified data record cannot be modified by the user; and implementing, with the at least one additive manufacturing apparatus of the user, at least one additive manufacturing process for the additive manufacturing of at least one defined component having the defined component properties on the basis of the at least one certified data record which has been retrieved, by the user, from the data storage;

wherein the at least one certified data record comprises the system-specific parameters, the component-specific parameters, and the process-specific parameters, that are required for the additive manufacturing of the specific component having the defined component properties and further includes machine-readable control information enabling a fully automated control or regulation of an operation of the at least one additive manufacturing apparatus of the user to conduct the additive manufacturing process of the at least one defined component with the at least one additive manufacturing apparatus of the user in fully automated manner without any user-side intervention, and wherein the component-specific parameters, the system-specific parameters and the process-specific parameters have been tested out, by the provider, under certain system-specific, component-specific and process-specific circumstances.

2. The method according to claim 1, further comprising providing the at least one certified data record which comprises the system-specific parameters, component-specific parameters or process-specific parameters certified by the provider for preparing the additive manufacturing process of the at least one defined component to be additively manufactured and having the defined component properties, and implementing at least one measure for preparing the at least one additive manufacturing process for the additive manufacturing of the at least one defined component to be additively manufactured and having the defined component properties on the basis of the at least one certified data record;

wherein the at least one measure for preparing the additive manufacturing process includes a measure for preparing a construction material to be used as part of the additive manufacturing process carried out for the additive manufacturing of a component having the defined component properties, temperature control, drying and/or inertizing of the construction material.

3. The method according to claim 1, further comprising providing the at least one certified data record which comprises the system-specific parameters, the component-specific parameters or the process-specific parameters certified by the provider for post-processing of the at least one additive manufacturing process of the at least one additively manufactured component having the defined component properties, and implementing at least one measure for the post-processing of the at least one additive manufacturing process for the additive manufacturing of the at least one additively manufactured component having the defined component properties on the basis of the at least one certified data record.

4. The method according to claim 1, wherein the certified data record comprises:

at least one geometric-structural parameter of the at least one defined component to be additively manufactured, comprising the geometric-structural parameters of the at least one defined component to be additively manufactured, as the component-specific parameters, at least one chemical parameter of the at least one defined component to be additively manufactured, comprising the chemical parameters of the at least one defined component to be additively manufactured, as the component-specific parameters, or at least one physical parameter of the at least one defined component to be additively manufactured, comprising the physical parameters of the at least one defined component to be additively manufactured, as the component-specific parameters.

5. The method according to claim 1, wherein the certified data record comprises:

at least one dimensional parameter of at least one construction field of the at least one additive manufacturing apparatus that is used or is to be used for the additive manufacturing of the at least one defined component to be additively manufactured, comprising the dimensional parameters of the at least one construction field of the at least one additive manufacturing apparatus that is used or is to be used for the additive manufacturing of the at least one defined component to be additively manufactured, as the system-specific parameters, at least one dimensional parameter of at least one construction volume of the at least one additive manufacturing apparatus that is used or is to be used for the additive manufacturing of the at least one defined component to be additively manufactured, comprising the dimensional parameters of the at least one construction volume of the at least one additive manufacturing apparatus that is used or is to be used for the additive manufacturing of the at least one defined component to be additively manufactured, as the system-specific parameters, or at least one manufacturing parameter of the at least one additive manufacturing apparatus that is used or is to be used for the additive manufacturing of the at least one defined component to be additively manufactured, comprising the manufacturing parameters of the at least one additive manufacturing apparatus that is used or is to be used for the additive manufacturing of the at least one defined component to be additively manufactured, as the system-specific parameters, or at least one system-type parameter of the at least one additive manufacturing apparatus that is used or is to be used for the additive manufacturing of the at least one defined component to be additively manufactured, comprising the system-type parameters of the at least one additive manufacturing apparatus that is used or is to be used for the additive manufacturing of the at least one defined component to be additively manufactured, as the system-specific parameters.

6. The method according to claim 1, wherein the certified data record comprises:

at least one construction-material parameter of at least one construction material which can be used for the additive manufacturing by the at least one additive manufacturing apparatus that is used or is to be used for the additive manufacturing of the at least one defined component to be additively manufactured, comprising the construction-material parameters of at least one construction material which can be used for the additive manufacturing by at least one additive manufacturing apparatus that is used or is to be used for the additive manufacturing of the at least one defined component to be additively manufactured, as the process-specific parameters, at least one chemical process parameter inside at least one construction or process area of the at least one additive manufacturing apparatus that is used or is to be used for the additive manufacturing of the at least one defined component to be additively manufactured, comprising the chemical process parameters of the at least one construction or process area of the at least one additive manufacturing apparatus that is used or is to be used for the additive manufacturing of the at least one defined component to be additively manufactured, as the process-specific parameters, at least one physical process parameter, selected from moisture, pressure, and temperature, outside or inside at least one construction or process area of at least one additive manufacturing apparatus that is used or is to be used for the additive manufacturing of the at least one component to be additively manufactured, comprising the physical process parameters of the at least one construction or process area of the at least one additive manufacturing apparatus that is used or is to be used for the additive manufacturing of the at least one defined component to be additively manufactured, as the process-specific parameters, at least one climatic process parameter, selected from moisture, pressure, and temperature, of at least one environment of the at least one additive manufacturing apparatus that is used or is to be used for the additive manufacturing of the at least one defined component to be additively manufactured, comprising the climatic process parameters of at least one additive manufacturing apparatus that is used or is to be used for the additive manufacturing of the at least one defined component to be additively manufactured, as the process-specific parameters, comprises at least one layer parameter describing a division of the at least one defined component to be additively manufactured into individual layers each comprising a cross section of the at least one defined component to be additively manufactured, comprising the layer parameters describing a division of the at least one defined component to be additively manufactured into the individual layers each comprising the cross section of the at least one defined component to be additively manufactured, as the process-specific parameters, at least one parameter, selected from a geometric-structural parameter or an arrangement parameter relative to the at least one defined component to be supported that is to be additively manufactured or has been additively manufactured, of at least one support element serving to support the at least one defined component that is to be additively manufactured or has been additively manufactured, comprising the parameters of the at least one support element serving to support the at least one defined component that is to be additively manufactured or has been additively manufactured, as the process-specific parameters, or comprises at least one construction-strategy parameter describing a construction strategy for the at least one defined component to be additively manufactured, comprising the construction-strategy parameters describing the construction strategy for the at least one defined component to be additively manufactured, as the process-specific parameters.

7. The method according to claim 1, wherein the certified data record comprises at least one geometric-structural parameter of at least one support element serving to support the at least one defined component that is to be additively manufactured or has been additively manufactured as the process-specific parameters, wherein the at least one support element is provided with at least one structural element that facilitates removal of the at least one support element from the additively manufactured component or is provided with a marker that visually highlights the support element to be removed.

8. The method according to claim 1, wherein the at least one additive manufacturing process for the additive manufacturing of the at least one defined component to be additively manufactured and having the defined component properties is implemented on the basis of the at least one certified data record by means of a user-side additive manufacturing apparatus in a fully automated manner.

9. The method according to claim 1, further comprising comparing at least one parameter that is detected by means of a detection apparatus as part of the additive manufacturing of the at least one defined component to be additively manufactured and having the defined component properties and relates to the additive manufacturing of the at least one defined component to be additively manufactured with the at least one reference parameter;

wherein the comparison information with regard to at least one evaluation criterion demonstrates that the at least one parameter that is detected by means of the detection apparatus has exceeded or fallen below at least one parameter-specific limit value or limit-value range.

10. The method according to claim 1, wherein the at least one certified data record is or has been generated by the provider on the basis of information from the provider, for the reference component corresponding to the component to be additively manufactured under the defined additive manufacturing conditions.

11. The method according to claim 1, wherein the at least one certified data record is or has been generated by a user or a third party on the basis of information from a user or a third party for a reference component corresponding to the component to be additively manufactured under the defined manufacturing conditions, wherein the information from the user or the third party is authorised by the provider with regard to at least one authorisation criterion that is predetermined or can be predetermined by the provider and the information only is authorised as the certified data record when positively authorised by the provider.

12. The method according to claim 1, wherein the at least one certified data record comprises a plurality of additive manufacturing processes that are possible on the basis of the at least one certified data record by means of an additive manufacturing apparatus.

13. The method according to claim 1, wherein the at least one certified data record is provided on a server that is or can be connected to at least one communication network, from which server said data record is or can be retrieved by a user; wherein the at least one certified data record is or can be retrieved on a user-side access portal.

14. The method according to claim 1, wherein the at least one certified data record comprises machine-readable control information for a fully automatic control of the operation of the at least one additive manufacturing apparatus for the additive manufacturing of the at least one defined component to be additively manufactured on the basis of the at least one certified data record.

15. The method according to claim 1, wherein as part of implementing the at least one additive manufacturing process for the additive manufacturing of the at least one defined component having the defined component properties on the basis of the at least one certified data record on a provider-side or a user-side output apparatus, at least one status display relating to the status of the relevant additive manufacturing process is generated.

16. The method according to claim 1, wherein a component of a packaging system for packaging separate objects is additively manufactured.

17. The method according to claim 1, wherein the at least one additive manufacturing process comprising a fused deposition modelling (FDM) process, is implemented, in which a plastics-based construction material is used for the additive manufacturing of the at least one defined component to be additively manufactured.

18. A method for producing a certified data record which comprises system-specific parameters, component-specific parameters and process-specific parameters that have been tested out under certain system-specific, component-specific, and process-specific circumstances and certified by a provider for additively manufacturing of at least one defined component having defined component properties, wherein the certified data record is or has been generated by the provider on the basis of information from the provider on the basis of manufacturing results for a reference component corresponding to the component to be additively manufactured, which results are empirically obtained by the provider under defined manufacturing conditions, or the certified data record is or has been generated by the user or a third party on the basis of information from the user or the third party on the basis of manufacturing results for the reference component corresponding to the component to be additively manufactured, which results are empirically obtained by the user or the third party under defined manufacturing conditions, the information from the user or the third party being authorised by the provider with regard to at least one authorisation criterion that is predetermined or can be predetermined by the provider and said information being used as a certified data record when authorised by the provider, wherein the certified data record cannot be modified by the user.

19. A system for the additively manufacturing of at least one component having defined component properties in accordance with a method according to claim 1, the system comprising at least one provision apparatus assigned to the provider, which is configured to produce the at least one certified data record which comprises the system-specific parameters, the component-specific, parameters and the process-specific parameters that have been tested out under the certain system-specific, component-specific and process-specific circumstances and certified by the provider for the additive manufacturing of at the least one defined component having the defined component properties, and the at least one additive manufacturing apparatus assigned to the user, which is configured to implement the at least one additive manufacturing process for the additive manufacturing of the at least one defined component having the defined component properties on the basis of the at least one certified data record, wherein the certified data record cannot be modified by the user.

* * * * *